(12) United States Patent
Hoshizawa et al.

(10) Patent No.: US 7,571,361 B2
(45) Date of Patent: Aug. 4, 2009

(54) RECORDING METHOD AND OPTICAL DISK RECORDING DEVICE

(75) Inventors: Taku Hoshizawa, Kawasaki (JP); Atsushi Fuchiwaki, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 373 days.

(21) Appl. No.: 11/652,966

(22) Filed: Jan. 12, 2007

(65) Prior Publication Data
US 2007/0291608 A1 Dec. 20, 2007

(30) Foreign Application Priority Data
Jun. 14, 2006 (JP) ............................. 2006-164172

(51) Int. Cl.
*G11C 29/00* (2006.01)
(52) U.S. Cl. .................................... 714/710; 369/47.14
(58) Field of Classification Search .............. 369/47.14, 369/47.22; 714/769, 54, 710
See application file for complete search history.

(56) References Cited

U.S. PATENT DOCUMENTS

| | | | |
|---|---|---|---|
| 7,272,086 B2 * | 9/2007 | Hwang et al. | 369/47.14 |
| 7,372,792 B2 * | 5/2008 | Park | 369/47.22 |
| 7,478,288 B2 * | 1/2009 | Park | 714/710 |
| 7,500,137 B2 * | 3/2009 | Park | 714/8 |
| 7,502,288 B2 * | 3/2009 | Park et al. | 369/47.14 |
| 2005/0147003 A1 * | 7/2005 | Hwang et al. | 369/47.14 |

FOREIGN PATENT DOCUMENTS

| | | |
|---|---|---|
| JP | 2004-171714 | 6/2004 |
| JP | 2004-303381 | 10/2004 |
| JP | 2006-040454 | 2/2006 |

OTHER PUBLICATIONS

Osta.org, "Universal Disk Format Specification", Revision 2.60, Optical Storage Technology Association, Mar. 1, 2005.
ECMA, "Standardizing Information and Communication Systems", 120nn/DVD Rewritable Disk (DVD-RAM), Standard ECMA-272, Feb. 1998.
ECMA, "Standardizing Information and Communication Systems", 80nn (1,23 Gbytes per side) and 120 mm (3,95 Gbytes per side) DVD Recordable Disk (DVD-R), Dec. 1998.

* cited by examiner

*Primary Examiner*—David Ton
(74) *Attorney, Agent, or Firm*—Townsend and Townsend and Crew LLP

(57) ABSTRACT

A recording method and a recording apparatus capable of optimally arranging data on a write-once type optical disc. In a write-once type optical disc recording method with respect to a disc having a read-in, a user area, and a read-out by employing defect management information, the user area is divided into 3, or more pieces of R-zones; at least 2 recordable R-zones having recordable areas are present. When an unrecordable R-zone having no recordable area is present on the read-in side rather than two, or more pieces of the R-zones among the R-zones having the recordable areas, a linear replacement destination of a logical overwriting is determined to such an R-zone other than an R-zone having a recordable area, which is located adjacent to the unrecordable R-zone.

8 Claims, 12 Drawing Sheets

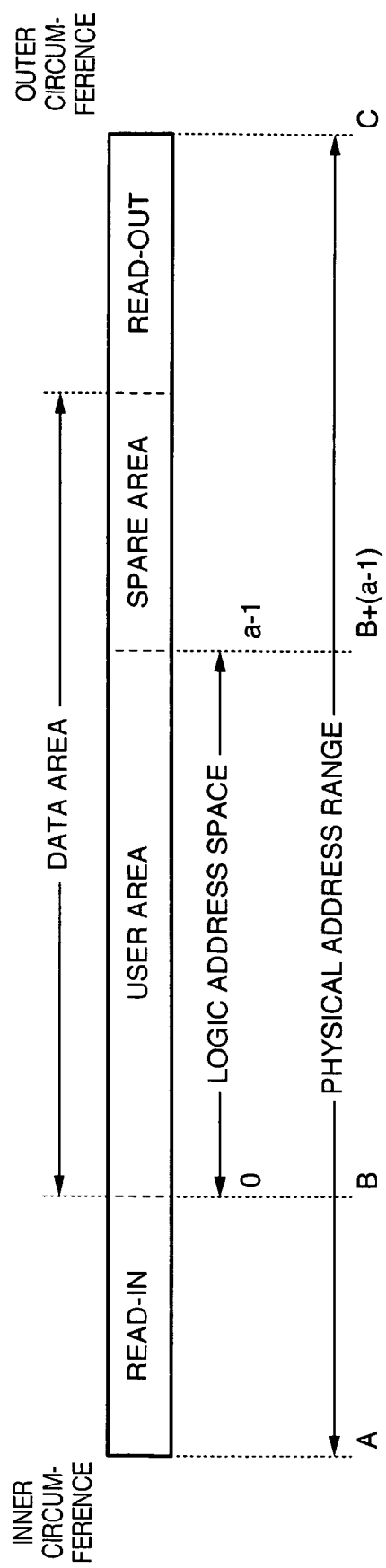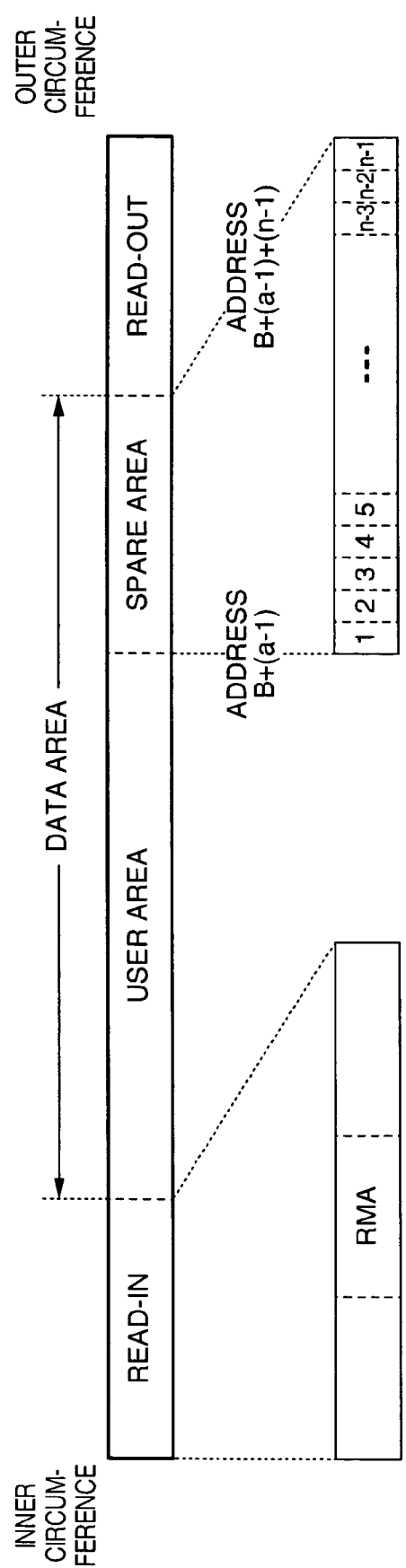

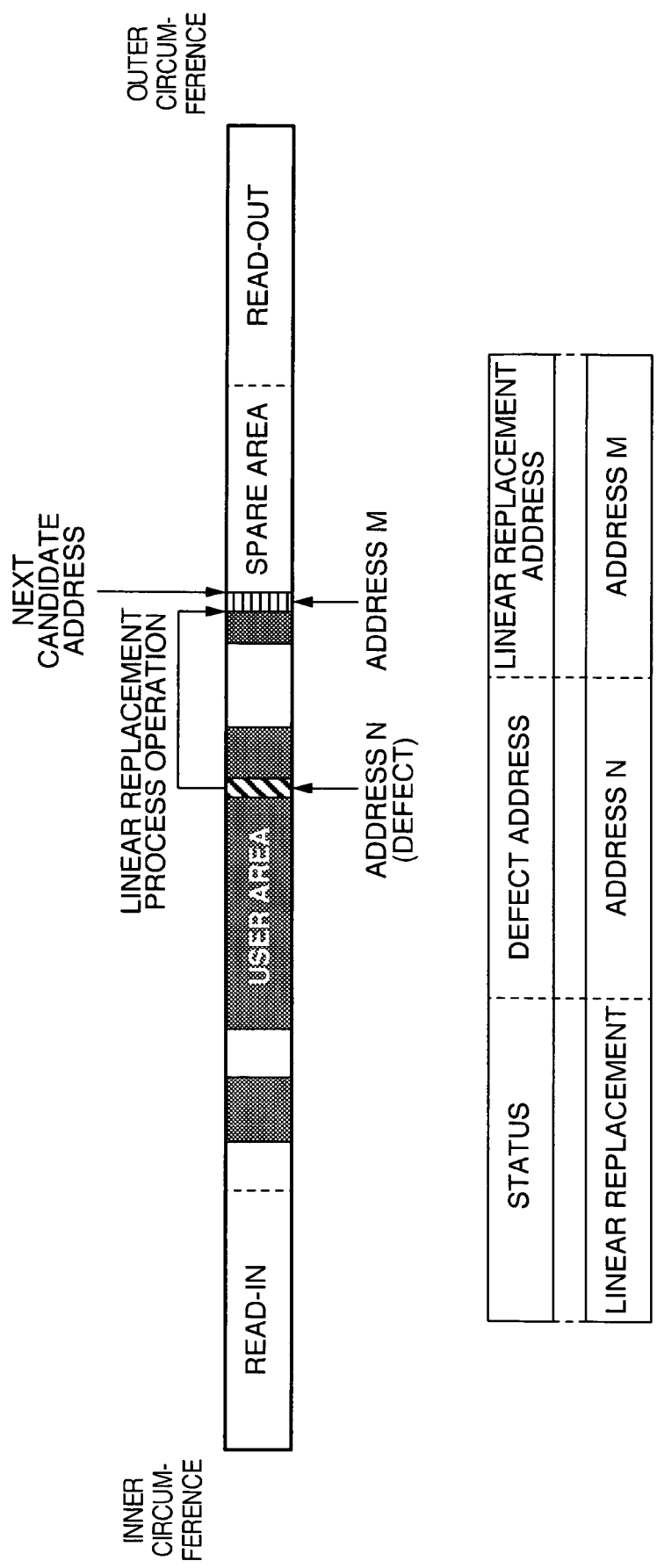

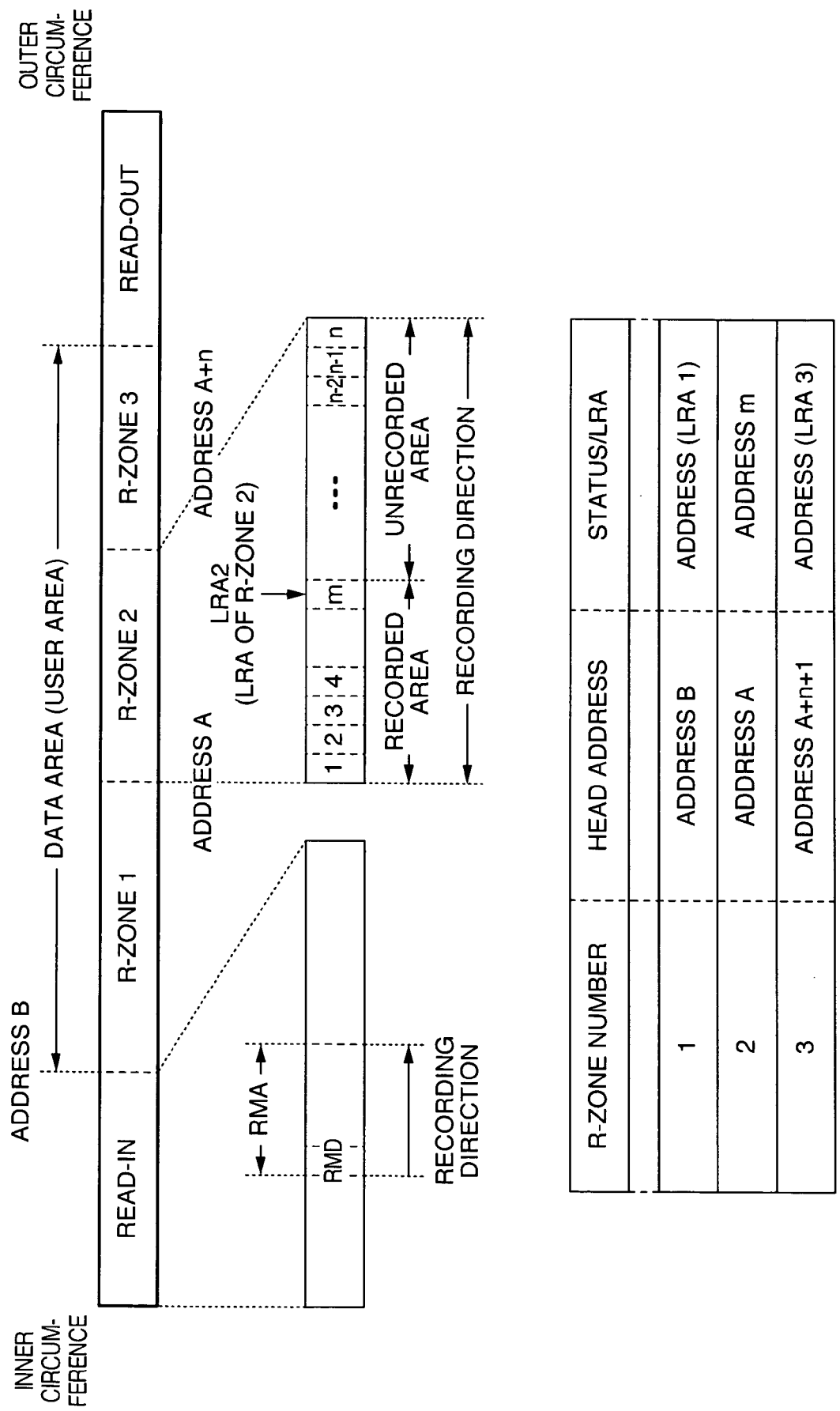

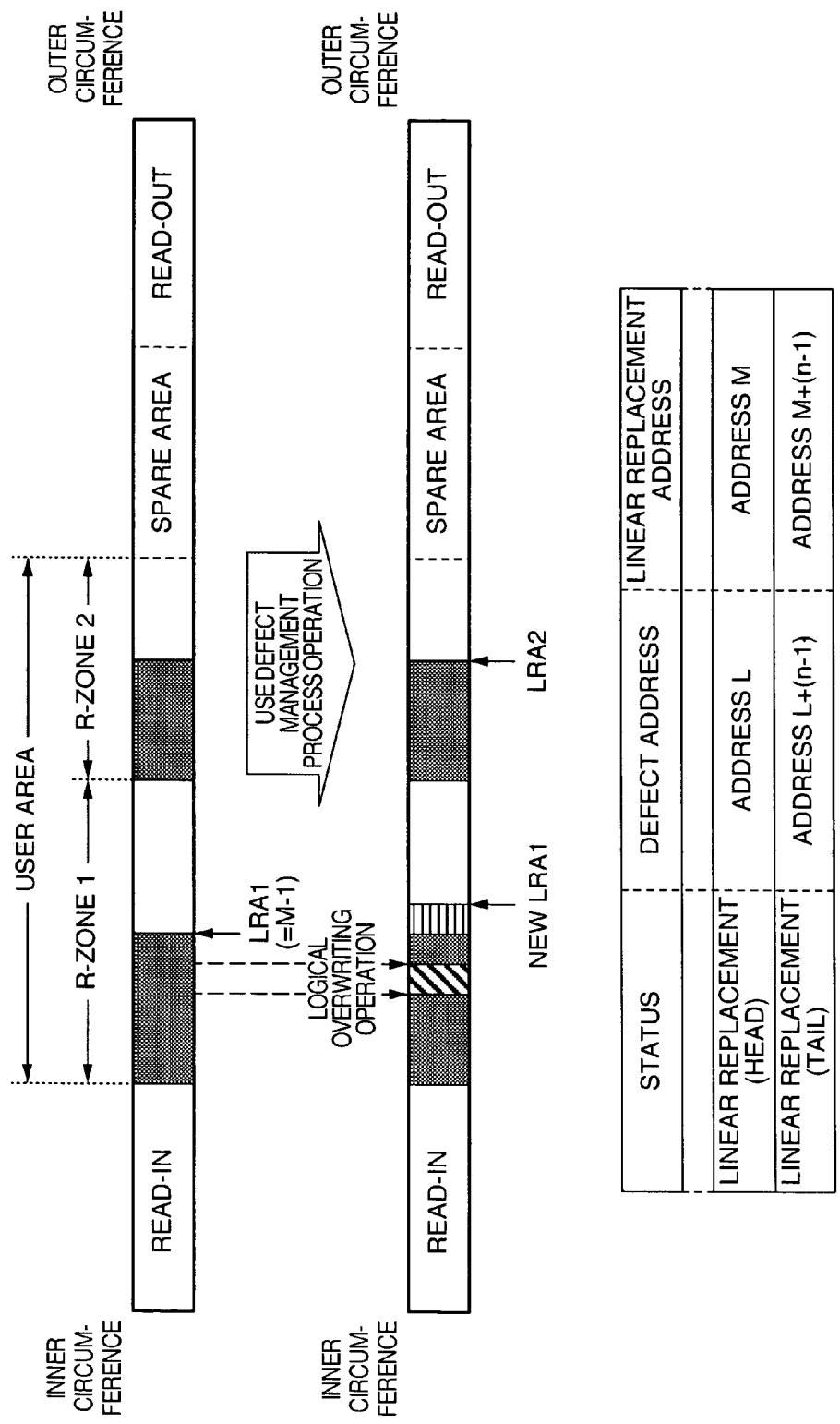

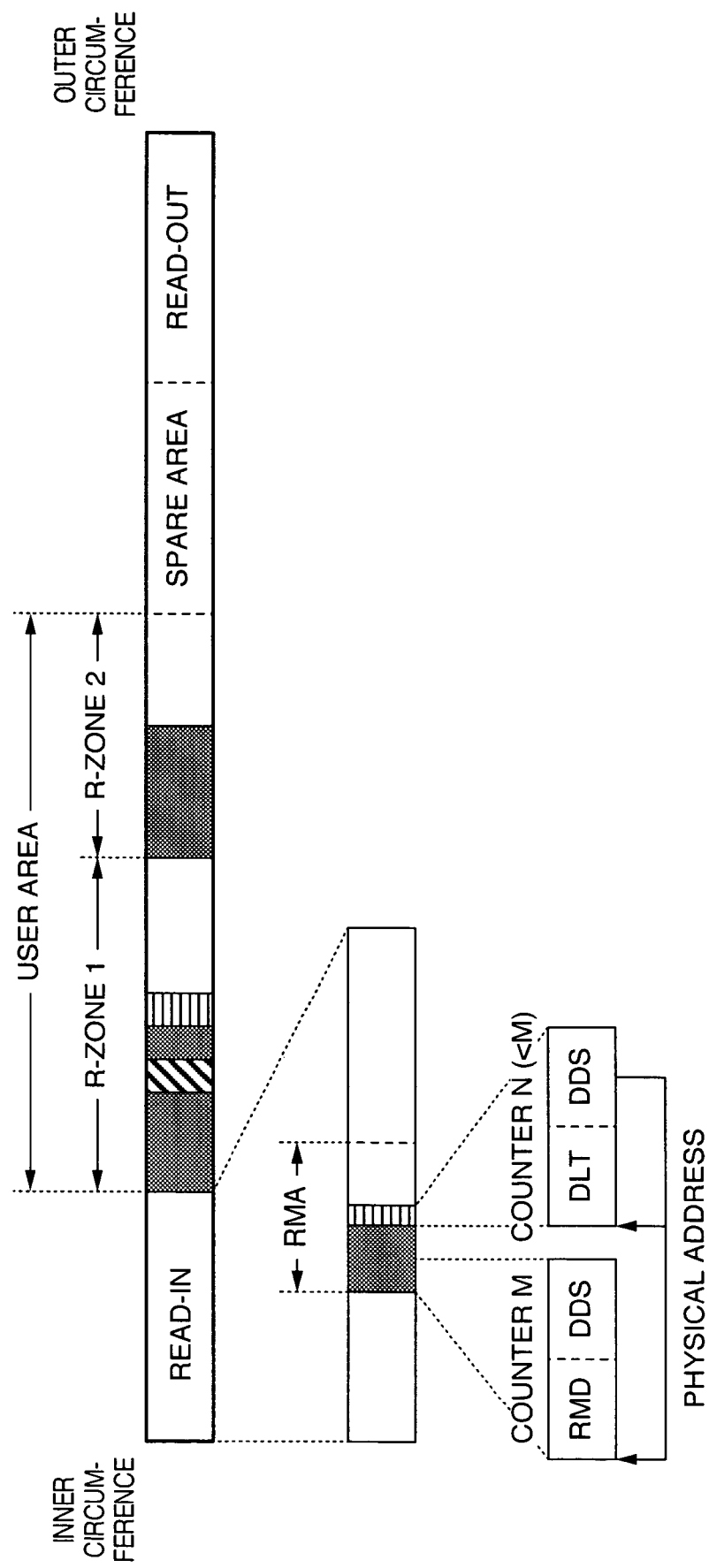

RECORDING METHOD AND OPTICAL DISK RECORDING DEVICE

INCORPORATION BY REFERENCE

The present application claims priority from Japanese application JP2006-164172 filed on Jun. 14, 2006, the content of which is hereby incorporated by reference into this application.

BACKGROUND OF THE INVENTION

1. Field of the Invention

The present invention generally relates to a recording method of an optical disc, and a recording apparatus of an optical disc. More specifically, the present invention is directed to a recording method and a recording apparatus, which are employed so as to record digital data on a write-once type optical disc.

As one example of apparatuses for recording and/or reproducing digital data on/from recording media, there are recording/reproducing apparatuses (drives) of DVD-RAMs which have been defined in "Standard ECMA-272: 120 mm DVD Rewritable Disc (DVD-RAM)" ECMA 1999 (pages 43 to 55), and so on.

When a DVD-RAM disc is inserted into this DVD-RAM drive, or a power supply thereof is turned ON, the DVD-RAM drive firstly investigates contents of drive management information data recorded in a defect management information area (DMA), and the like, which are arranged in a read-in and a read-out, and thus, checks as to whether or not the DVD-RAM disc has been physically formatted. In the case that the DVD-RAM disc has not yet been physically formatted, the DVD-RAM drive waits until a physical formatting instruction is issued from a host.

2. Description of the Related Art

As related art, the below-mentioned publications are disclosed: JP-A-2004-171714, JP-A-2004-303381, and "standard ECMA-279: 80 mm (1.23 Gbytes per side) and 120 mm (3,95 Gby0tes per side) DVD-Recordable Disc (DVD-R)" ECM 1998 (No. 60-61 page) and also, "Universal Disc Format Specification Revision 2.60" OSTA 2005 (No. 147-page 150).

SUMMARY OF THE INVENTION

In the case that a DVD-RAM disc has been physically formatted, a DVD-RAM drive performs recording preparation process operations such as a calibration process operation and a logical matching verification, and thereafter, is brought into an instruction waiting status for waiting an instruction from a host. When the DVD-RAM drive accepts a certain "command" from the host, the DVD-RAM drive checks a meaning of this command. When the checked command corresponds to a recording command, the DVD-RAM drive performs a recording process operation of user data, whereas when the checked command corresponds to a reproducing command, the DVD-RAM drive performs a reproducing process operation, namely, reproduces data recorded on the DVD-RAM to produce user data. Also, when the checked data corresponds to a command for ejecting an optical disc, the DVD-RAM drive executes a process operation in correspondence with the received command. Normally, although these process operations are accomplished under normal condition, there are some possibilities that the process operations cannot be completed under the normal condition due to a very few number of unexpectable reasons. For instance, in such a case that an optical disc contains a defect within a user area, and the DVD-RAM drive fails in recording of user data with respect to a recording command, the DVD-RAM drive performs such an error recovery process operation as a retry process operation and a linear replacement process operation.

Normally, when a DVD-RAM drive performs a recording process operation of user data, in order to judge as to whether or not the user data could be recorded under normal condition after the recording operation, the DVD-RAM drive actually reproduces the recorded data from the DVD-RAM, so that the DVD-RAM drive confirms a recording quality. As a result, since the DVD-RAM drive executes a linear replacement process operation if required, reliability of an optical disc is improved, while the linear replacement process operation arranges the user data in a spare area instead of the user area. In general, a spare area arranged adjacent to a read-out of an optical disc is continuously used along a direction directed from the read-out side to the read-in side. This reason is given as follows: That is, a size of a spare area can be extended in response to a total number of defects which is increased due to a characteristic deterioration of an optical disc recording layer, which occurs when an overwriting operation is repeated.

The ECMA-272 standardizes that the address correspondence information between the user area and the spare area, which indicates the result of this linear replacement process operation, is recorded on a defect list (DL) in the DMA.

In a write-once type optical disc (direct read after write optical disc) such as a DVD-R, while several places of a user area are normally used as starting points, data recording operation is continuously carried out within a logical address space managed by a host in an address ascent direction. In order to accept this recording system, the user area is logically divided into a plurality of so-called "R-zones" in a DVD-R, and two sorts of address information are recorded in recording area management data (RMD) within a recording area management information area (RMA). The two sorts of address information are constituted by a head address of an R-zone which becomes a starting point of recording data, and a last recording address (LRA) of a continuous recorded area from the head address within the R-zone.

A method for managing recorded areas within a data area by employing this R-zone has been standardized based upon "Standard ECMA-279: 80 mm (1.23 Gbytes per side) and 120 mm (3.95 Gbytes per side) DVD-Recordable Disc (DVD-R)" ECMA 1998 (pages 60 to 61).

Also, JP-A-2004-171714 and JP-A-2004-303381 describe methods capable of realizing logical overwriting operations on write-once type optical discs having such recording layers such as a DVD-R, on which an overwriting operation cannot be physically carried out by expanding a linear replacement process operation which is employed in defect management of a DVD-RAM.

As file systems for managing files on optical discs, the UDF (Universal Disc Format) has been proposed. In the case that an optical disc is inserted into a disc drive and a host reads out file data from the inserted optical disc, while several sorts of file system management information are employed, a file retrieving operation is carried out in this sequence of "AVDP (Anchor Volume Descriptor)→VDS (LVD (Logical Volume Descriptor))→FE (File Entry) of MD (Meta Data) file→FSD (File Set Descriptor)→ICB (Information Control Block) of route directory→FID (Field Identifier Descriptor) within route directory→ - - - ICB of file→data." Then, the host reads out file data by employing this retrieved result.

The AVDP corresponds to a point which is firstly read by the host, so that the host can trace all of files on the optical disc from this AVDP point. The AVDPs have been recorded at two, or more points among a sector of logic block number (LBN) 256, a last sector (Z), and a sector of Z-256. Also, such a recording technical idea capable of having a file system structure similar to that of a rewritable optical disc even in a write-once type optical disc has been described, while the above-explained logical overwriting technical idea is employed in the latest universal disc format (UDF) in this write-once type optical disc. Since this technical idea is utilized, even in such a write-once type optical disc under recording operation, anchor volume descriptors (AVDPs) can be arranged in the sector of the logic block number (LBN), the last sector (Z), and the sector of Z-256. Further, in the latest UDF format, the following method has been recommended: That is, while file management information call as "meta data" to be recorded on an optical disc, and information related to directories are managed as a single file as meta data file, this meta data file is arranged on the optical disc in combination therewith in view of "robustness" of the meta data which becomes most important in a file system. A detailed content of this UDF format is described in "Universal Disc Format Specification revision 2.60" OSTA 2005 (pages 147 to 150).

The logical overwriting technical ideas of write-one optical discs described in JP-A-2004-171714 and JP-A-2004-303381 may become effective in the below-mentioned rewriting operations as to file system management information data, as described in "Universal Disc Format Specification revision 2.60" OSTA 2005 (pages 147 to 150). For example, anchor data recorded at a fixed address which is read when a data reading operation from an optical disc is commenced is rewritten; AVDP in UDF, and file management information which is required to be rewritten in a file adding process, a file deleting process, and a file correcting process are rewritten; and meta data such as directory information is rewritten.

However, in the above-described Japanese publications of JP-A-2004-171714 and JP-A-2004-303381, as the recording area management data of the write-once type optical discs to which the logical overwriting process operations have been applied, such a space bit map has been applied which is different from the write-once type optical disc recited in "Standard ECMA-279: 80 mm (1.23 Gbytes per side) and 120 mm (3.95 Gbytes per side) DVD-Recordable Disc (DVD-R)" ECMA 1998 (pages 60 to 61).

As a result, the conventional method for sequentially recording the user data and for managing the recording areas based upon the R-zones and the LRAs (last recording addresses) owns such a problem, i.e, how to determine a linear replacement destination of a logical overwriting operation in a concrete manner. While "Universal Disc Format Specification Revision 2.60" OSTA 2005 (pages 147 to 150) employs the above-explained recording system, this format specification has made the following description: That is, as a linear replacement destination, any one of a spare area for managing defects, and an NWA of an arbitrary R-zone. This NWA implies such a value that an LRA (last recording address) is corrected to an address boundary which becomes a physically minimum recording unit.

The present invention has been made to solve the above-explained problem, and therefore, has an object to provide a recording method and a recording apparatus, which are capable of arranging data on a write-once type optical disc in an optimum condition.

To solve the above-described problem, in accordance with the present invention, the below-mentioned recording method and optical disc recording apparatus may be provided.

That is to say, in order to solve the above-explained problem, in accordance with the present invention, the following recording method is provided which is featured by such a write-once type optical disc recording method for performing a logical overwriting process operation with respect to a write-once type optical disc having a read-in, a user area, and a read-out by employing defect management information which is recorded in said read-in, wherein: the user area is divided into 3, or more pieces of R-zones; at least 2 recordable R-zones having recordable areas are present; and when an unrecordable R-zone having no recordable area is present on the read-in side rather than two, or more pieces of the R-zones among the R-zones having the recordable areas, a linear replacement destination of a logical overwriting process operation with respect to an arbitrary region of the unrecordable R-zone is determined to such an R-zone other than an R-zone having a recordable area, which is located adjacent to the unrecordable R-zone.

Also, in order to solve the above-explained problem, in accordance with the present invention, the following recording method is provided which is featured by such a write-once type optical disc recording method for performing a logical overwriting process operation with respect to a write-once type optical disc having a read-in, a user area, and a read-out by employing defect management information which is recorded in the read-in, wherein: the user area is divided into a plurality of R-zones to which numbers are allocated, the numbers being incremented one by one from the read-in side to the read-out side; and when at least 2, or more pieces of R-zones having recordable areas are present, a linear replacement destination of a logical overwriting process operation with respect to an arbitrary area within an R-zone of an R-zone number having no recordable area is determined to such an R-zone having an R-zone number except for R-zone numbers (N+2×n) (symbol "n" being natural number) having recordable areas, the R-zone of the R-zone number N having no recordable area being arranged on the read-in side rather than two, or more pieces of continuous R-zones among the R-zones having the recordable areas.

Also, in order to solve the above-explained problem, in accordance with the present invention, the following recording method is provided which is featured by such a write-once type optical disc recording method for performing a logical overwriting process operation with respect to a write-once type optical disc having a read-in, a user area, and a read-out by employing defect management information which is recorded in the read-in, wherein: the user area is divided into a plurality of R-zones; at least 2 recordable R-zones having recordable areas are present; when a linear replacement destination of a logical overwriting process operation with respect to an arbitrary region within the user area is determined, a judgement is made as to whether or not a first R-zone containing the arbitrary area owns a recordable area; in the case that the first R-zone owns the recordable area, the first R-zone is determined as the linear replacement destination; and in the case that the first R-zone does not have the recordable area, a third R-zone having an unrecordable area is determined as the linear replacement destination except for a second R-zone located adjacent to the first R-zone, the third R-zone being located at the nearest position among positions of the plural R-zones on the read-out side rather than the arbitrary area.

Also, in order to solve the above-explained problem, in accordance with the present invention, the following recording method is provided which is featured by such a write-once type optical disc recording method for performing a logical overwriting process operation with respect to a write-once type optical disc having a read-in, a user area, and a read-out by employing defect management information which is recorded in the read-in, wherein: the user area is divided into a plurality of R-zones to which numbers are allocated, the numbers being incremented one by one from the read-in side to the read-out side; at least 2, or more pieces of recordable R-zones having recordable areas are present; when a linear replacement destination of a logical overwriting process operation with respect to an arbitrary region within the user area is determined, a judgement is made as to whether or not an R-zone "N" containing the arbitrary area owns a recordable area; in the case that the R-zone "N" owns the recordable area, the R-zone "N" is determined as the linear replacement destination; and in the case that the R-zone "N" does not have the recordable area, such an R-zone having an unrecorded area is determined as the linear replacement destination except for R-zones (N+2×n)(symbol "n" being natural number), the R-zone being arranged at the nearest read-out side rather than the arbitrary area.

Also, in order to solve the above-explained problem, in accordance with the present invention, the following optical disc recording apparatus is provided which is featured by such a recording apparatus of a write-once type optical disc, for performing a logical overwriting process operation with respect to the write-once type optical disc having a read-in, a user area, and a read-out by employing defect management information which is recorded in the read-in thereof, wherein: in the case that the user area is divided into a plurality of R-zones and at least two, or more pieces of R-zones having recordable areas are present, when a recording process operation to an arbitrary recorded area is accepted, recording positions of an entire record acceptable areas where the recorded arbitrary area is defined as a head are allocated in this order of: 1. the same R-zones containing the recorded arbitrary area, 2. in the case that an R-zone corresponding to the above-described 1 does not have a recordable area, such an R-zone having an unrecorded area which is arranged at the nearest read-out side rather than the area except for an R-zone located adjacent to the R-zone, and 3. in the case that all of R-zones corresponding to the above-described 1 and 2 do not have a recordable area, or such an R-zone corresponding to the above-described 1 and 2 is not present, such an R-zone having an unrecorded area, which is arranged at the most read-out side among the remaining R-zones.

Also, in order to solve the above-explained problem, in accordance with the present invention, the following optical disc recording apparatus is provided which is featured by such a recording apparatus of a write-once type optical disc, for performing a logical overwriting process operation with respect to the write-once type optical disc having a read-in, a user area, and a read-out by employing defect management information which is recorded in the read-in thereof, wherein: in the case that the user area is divided into a plurality of R-zones to which numbers are allocated, the numbers being incremented one by one from the read-in side to the read-out side, and at least two, or more pieces of R-zones having recordable areas are present, when a recording process operation to an arbitrary recorded area is accepted, recording positions of an entire record acceptable areas where the recorded arbitrary area is defined as a head are allocated in this order of: 1. the same R-zones "N" containing the recorded arbitrary area, 2. in the case that an R-zone corresponding to the above-described 1 does not have a recordable area, such an R-zone having an unrecorded area which is arranged at the nearest read-out side rather than the area except for an R-zone (N+2×n)(symbol "n" being natural number), and 3. in the case that all of R-zones corresponding to the above-described 1 and 2 do not have a recordable area, or such an R-zone corresponding to the above-described 1 and 2 is not present, such an R-zone having an unrecorded area, which is arranged at the most read-out side among the remaining R-zones.

In accordance with the present invention, since the data can be arranged on the write-once type optical disc in the optimum condition, the data can be reproduced in a high speed.

BRIEF DESCRIPTION OF THE DRAWINGS

FIG. 5 is an explanatory diagram for explaining a correspondence relationship between a logic address space and a physical address of an optical disc.

FIG. 6 is an explanatory diagram for representing a recording type optical disc having a defect management function.

FIG. 7 is an explanatory diagram for explaining a linear replacement process operation and a DL of the recording type optical disc.

FIG. 8 is an explanatory diagram for representing a recording area managing method of a write-once type optical disc.

FIG. 9 is an explanatory diagram for showing a structure of a write-once type optical disc having a logic overwrite function.

FIG. 10 is an explanatory diagram for representing an arrangement of drive management information of the write-once type optical disc having the logic overwrite function.

DESCRIPTION OF THE EMBODIMENTS

It should be understood that although various embodiments as to recording methods according to the present invention will be described in detail with reference to drawings, the present invention is not limited only to the below-mentioned embodiment modes.

Figure 2:
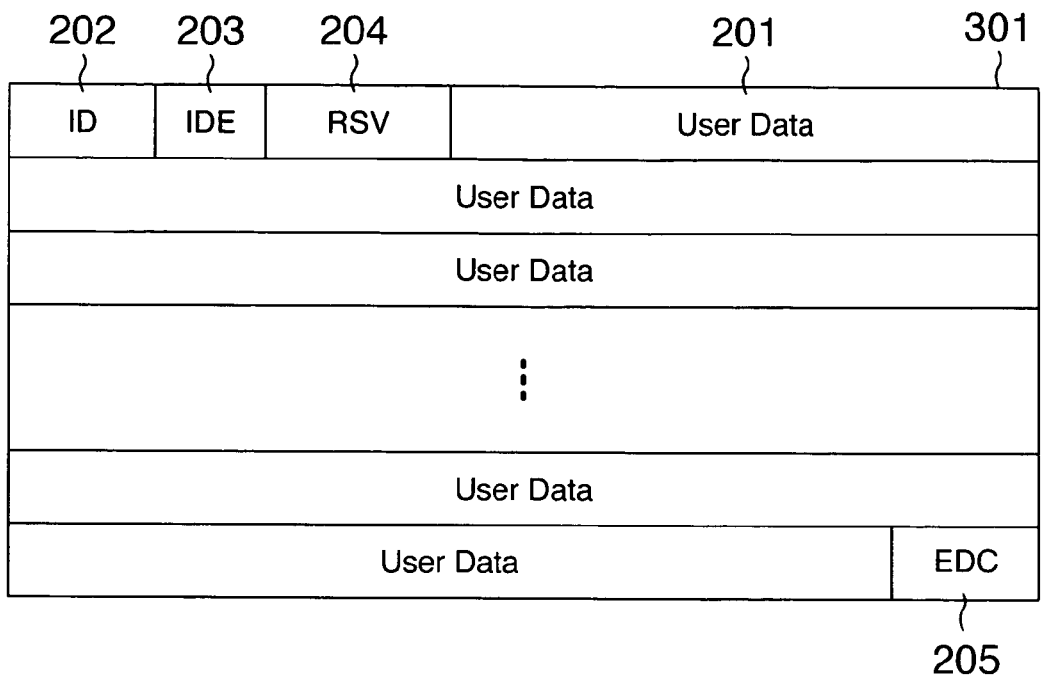
FIG. 2 is an explanatory diagram for explaining a structure of a data frame.
Figure 3:
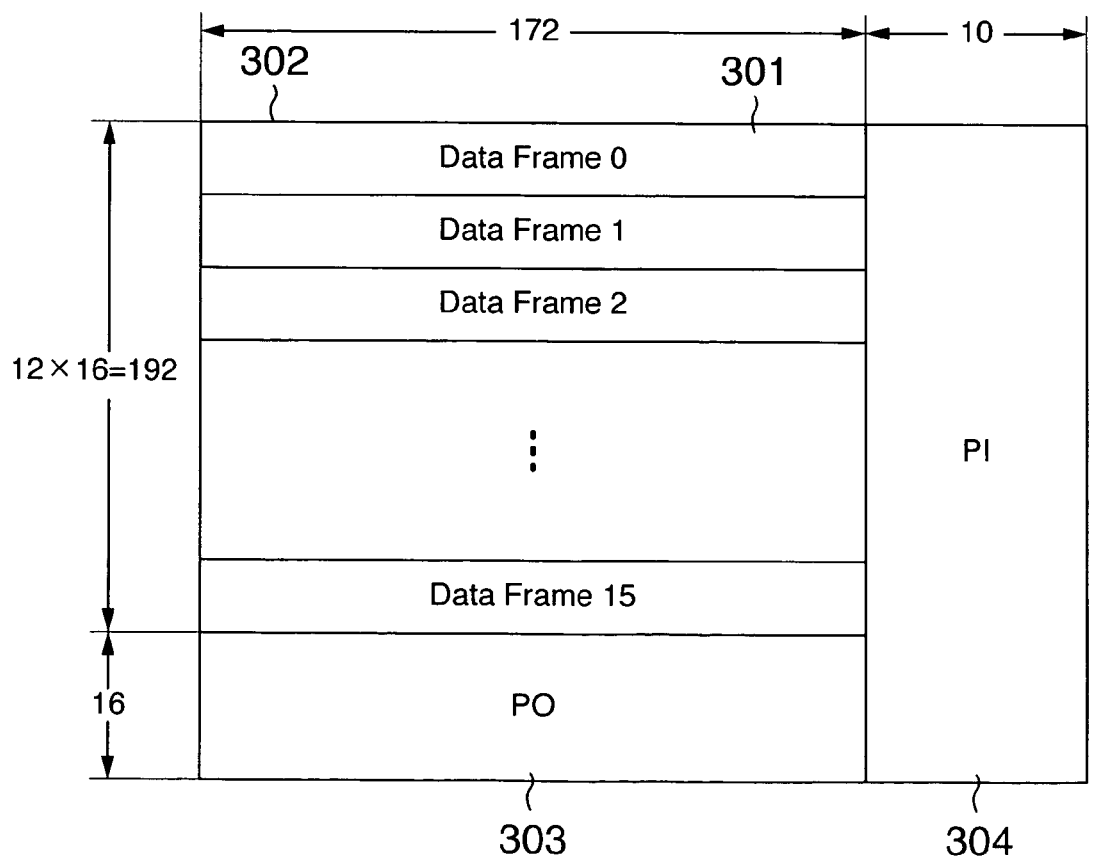
FIG. 3 is an explanatory diagram for explaining a structure of an ECC block.
Figure 4:
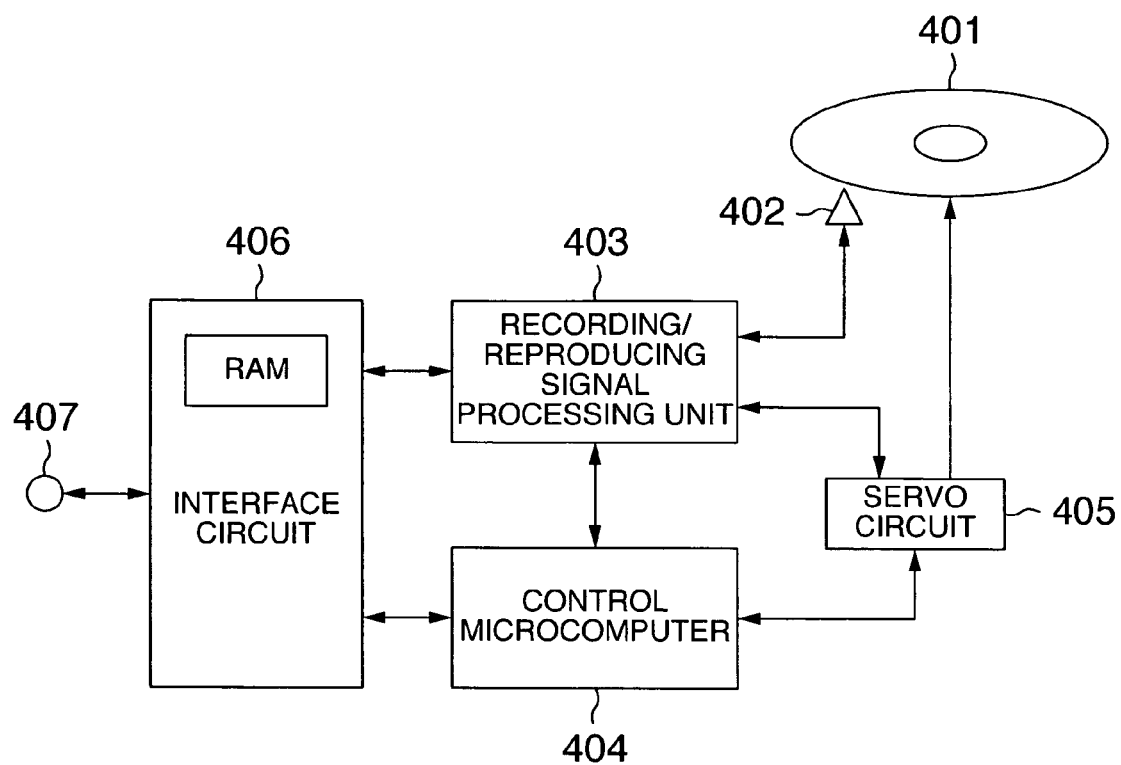
FIG. 4 is an explanatory diagram for indicating an arrangement of an optical disc drive according to an embodiment of the present invention.

In the beginning, a description is made of basic structures as to formats of recording data and drives, which are used in explanations of the present invention with reference to FIG. 2 to FIG. 4.

FIG. 4 indicates an example as to an arrangement of an optical disc drive according to an embodiment of the present invention. As shown in FIG. 4, the optical disc drive is equipped with an optical head 402, a recording/reproducing signal processing circuit 403, a control microcomputer 404, a servo circuit 405, an interface circuit 406, an input/output terminal 407. The optical head 402 mounts thereon a laser diode and a photodetector. The recording/reproducing signal processing circuit 403 performs an encoding process operation for data recording operation and a decoding process operation for data reproducing operation. The control microcomputer 404 performs management of circuit operations. The interface circuit 406 interfaces with a host, and contains a RAM which temporarily stores thereinto data in either an encoding process stage or a decoding process stage. The input/output terminal 407 is connected to the host by way of a cable.

When a reproducing operation is performed, data recorded on the optical disc 401 is read out from the optical head 402, and then, the read data is decoded by the recording/reproducing signal processing circuit 403. The above-described decoding process operation includes a demodulating process operation, an error correcting process operation, and a scramble releasing process operation. User data obtained after the decoding process operation has been carried out is stored in the RAM employed in the interface circuit 406, and thereafter, the user data is outputted via the input/output terminal 407 to such a host as an external personal computer and an MPEG board. In response to an instruction issued from the host, or the like, while the control microcomputer 404 executes a rotating control operation of the optical disc 401, a focusing control operation and a tracking control operation of the optical head 403 by employing the servo circuit 405, the control microcomputer 404 causes the optical head 403 to access a target position on the optical disc 401 so as to perform a reproducing control operation of the entire drive.

When a recording operation is carried out, user data is inputted from an external host via the input/output terminal 407 to the optical disc drive. The inputted user data is stored in the RAM employed in the interface circuit 406, and thereafter, the inputted data is encode-processed by the recording/reproducing signal processing circuit 403, for instance, a scramble process operation, an error correction coding process operation, a modulating process operation, and the like. Subsequently, the encode-processed user data is written via the optical head 402 in the optical disc 401. Upon receipt of an instruction issued from a host, and the like, the control microcomputer 404 controls the optical head 402 to access a recording position on the optical disc 401, which is designated, by employing the servo circuit 405 so as to perform a recording control operation of the entire optical disc drive.

A detailed description is made of encoding stages from user data 201 to recording data when the user data is recorded in this optical disc drive with reference to FIG. 2 and FIG. 3.

FIG. 2 represents one example as to a structure of a data frame 301. The data frame 301 implies a data stream made by combining user data 201 with information data for managing the above-described user data 201. With respect to the user data 201 constructed of 2,048 bytes, which is entered from an upper grade apparatus 9, a data identification code (ID) 202 made of 4 bytes, an IED 203 made of 2 bytes, and an RSV 204 made of 6 bytes are added. The data identification code 202 is used to identify data. The IED 203 corresponds to an error detection code of an ID. The RSV 204 corresponds to spare data area. Also, an error detection code EDC 205 made of 4 bytes is added to the last portion of this data stream, so that such a data frame 301 made of 2,064 bytes is constructed. The error detection code EDC 205 detects an error contained in data. Each of the data frames 301 is handled in the form of 172 bytes and 12 columns.

FIG. 3 shows a structure method of an ECC block 302. Normally, the above-explained ECC block 302 becomes a data unit for recording/reproducing operations of an optical disc recording/reproducing apparatus. Data frames 301 made of 172 bytes 12 columns which are constructed as represented in FIG. 2 are scramble-processed, and thereafter, the scramble-processed data frames 301 constitute an ECC block 302 in the unit of 16 data frames. An outer code (PO) 303 having 16 bytes is added to each of columns along a longitudinal direction, so that 208 rows are produced. With respect to the data of the expanded respective rows, an inner code (PI) 304 having 10 bytes is added, so that the resultant data become data having 182 bytes. As a result, the ECC block 302 is formed by user data 201 of 2,048 bytes×16, constituted by 182 bytes, 208 rows.

In the recording/reproducing signal processing circuit 403, this ECC block is produced, and thereafter, although not shown, a frequency modulation for limiting a frequency component contained in data is carried out as a final process operation for the encoding operations.

In a recording/reproducing apparatus for performing a linear replacement process operation, for instance, in a DVD-RAM drive, a confirmation work is performed as follows: That is, when user data is processed, after data is recorded, the data recorded on an optical disc is immediately reproduced, and then, this reproduced data is compared with user data left in a RAM, or an error correction process operation is carried out so as to detect a total error number contained in the reproduced data. As a result, a confirmation is made as to whether or not the data is recorded on the optical disc under normal condition. In the case that it is so judged that the data is not recorded under the normal condition, a recording operation to the same position (same address) is repeatedly carried out. When it is so judged that the data cannot be recorded at this address position under normal condition even if the data recording operation is repeated, namely, it is so judged that this address position is a defect, such a linear replacement process operation is carried out by which the user data left in the RAM of the interface circuit 406 is recorded within a spare area Normally, as represented by using FIG. 3, these linear replacement process operations are carried out in an ECC block corresponding to a unit of recording/reproducing operation. In the format of the data explained with employment of FIG. 2 and FIG. 3, since a data identification code (ID) has been added in the unit of a data frame, a head of the ECC block becomes a duplication of 16, and becomes the data frame unit in correspondence with a logic address. However in this embodiment, in order to make a simple explanation, lower 4 bits of the data identification code (ID) are neglected, a single physical address is allocated to an ECC block, and then, a single logic address is defined in correspondence with this physical address. As a consequence, in the below-mentioned explanation, it is so assumed that a data unit of a recording/reproducing command issued from a host is also constructed of the unit of the ECC block.

Next, a description is made of one example as to a logical overwriting method in a write-once type optical disc (namely, direct read after write optical disc).

The explanation will be made in a stepwise manner. Firstly, an explanation is made of a relationship between a logic address space and a physical address on an optical disc, which are used by a host with employment of FIG. 5. Next, an explanation is made of a defect managing method and a summary related to an area which is required in defect management executed in a DVD-RAM, and the like with reference to FIG. 6 and FIG. 7. Then, a description is made of a recording method and a recording area managing method, which are carried out in a DVD-R and the like with reference to FIG. 8. Thereafter, a logical overwriting method on a write-once type optical disc will be explained with employment of FIG. 9.

FIG. 5 is a diagram for indicating a relationship between physical addresses of an optical disc which is subdivided into plural areas depending upon purposes, and logic addresses contained in a recording/reproducing command issued from a host. It is so assumed that optical disc has been logically subdivided into a read-in, a data area, and a read-out. Also, in this example, in order to perform defect management, such a case that the data area has been logically divided into a user area and a spare area will be exemplified. A starting physical address of the read-in and a starting physical address of the data area correspond to "A" and "B" respectively, whereas an ending physical address of the read-out corresponds to "C." Although there is such a case that a relationship of A>B>C is established depending upon physical address specification of an optical disc, the below-mentioned explanation is assumed by that a relationship of A<B<C can be established. In this case, the logic addresses are allocated only to the user area as initial condition, and when a linear replacement is not performed, a physical address "B+n" is defined in correspondence with a logic address "n." However, in such a case that "B+n" is allocated to another address as a replacement subject, a physical address of a replacement destination is defined in correspondence with the logic address "n". As a consequence, when a final address of the user area is "B+(a−1)", addresses "0" to "a−1" may be used in maximum as the logic address space.

FIG. 6 is an explanatory diagram for showing a disc in order to schematically explain defect management by a linear replacement process operation (Linear Replacement method) which is generally executed in a recording type optical disc, namely an explanatory diagram for indicating that the recording type optical disc has been logically subdivided into respective areas in response to a purpose. Simply speaking, while the optical disc has been logically subdivided into a read-in, a data area, and a read-out, the data area is furthermore and logically subdivided into a user area and a spare area in response to a purpose. While a recording management information area (RMA) for recording thereinto recording management information of the data area is provided, division information as to the data area, disc structure definition information (DDS), and a defect list table (DLT) are recorded therein. Such an information related to a logic structure as to a candidate address within the spare area which is subsequently used is contained in the disc structure definition information (DDS). The defect list table (DLT) contains a plurality of DLs (defect lists) which represent a correspondence relationship between defect addresses within the user area and linear replacement addresses of the spare area, which are used as replacement destinations thereof. Also, the spare area arranged on the outer circumferential side of the user area is continuously used along a direction from the read-in to the read-out.

A structure of DLs (defect lists) which are used in defect management is indicated in detail by employing FIG. 7. Each of the DLs is arranged by a defect address within a user area, a replacement address within a spare area, which is allocated by a linear replacement process operation, and status information for indicating a relationship between two sets of these defect address and replacement address. In this drawing, areas which are painted over with black on the optical disc indicate recorded areas. The next candidate address contained in the DDS (disc structure definition information) indicates an address "M" within the spare area, which is subsequently used in the replacement process operation. When it is so judged that an address "N" of the user area is a defect from this condition, the user data which has been surely recorded from the host at the address "N" is replaced by the address "M" of the spare area to be recorded. In order to indicate this information, the DL (defect list) is constituted by the "address N", the "address M", and "replacement" for indicating the relationship of these two addresses.

FIG. 8 is an explanatory diagram for showing an optical disc in order to schematically explaining both a recording process operation and an RMD thereof, which are generally employed in a write-once type optical disc, namely such a diagram that a data area of the optical disc has been logically subdivided into 3 R-zones. Simply speaking, it is so assumed that the optical disc has been logically subdivided into a read-in, a data area (identical to user area in FIG. 8), and a read-out. Moreover, the data area is logically subdivided into a plurality of R-zones in response to a recording position. An RMD is recorded in the RMA within the read-in, while the RMD contains two sorts of addresses, namely, a head address of the logically divided R-zone, and an LRA where the user data has been recorded. Within the respective R-zones and the RMA, data recording operation is continuously carried out along a direction from the read-in to the read-out, and a new R-zone is added by dividing an arbitrary R-zone. An R-zone where additionally recordable unrecorded area is left is indicated by an R-zone under Open status, whereas an R-zone where a recordable area is not contained is expressed as an R-zone under Close status. In this embodiment, "recordable or not" for indicating a status owns a different meaning from "recording command is acceptable, or not", but expresses such a meaning for indicating as to "whether or not it is so permitted that physically new data is additionally written in R-zone, or whether or not all of areas become recorded areas."

FIG. 9 is an explanatory diagram of an optical disc for schematically explaining a logical overwriting operation by a linear replacement method performed in a write-once type optical disc, and also, a diagram for indicating DL of the linear replacement method, by the logical overwriting operation. In this drawing, while the write-once type optical disc is subdivided into a read-in, a read-out, and a data area in response to a use purpose, the data area has been divided into two R-zones, namely, an R-zone 1 having an LRAL as an LRA1, and another R-zone 2 having an LRA2. A place which is painted over with black within the R-zones shows a recorded area; a reverse-printed portion within the R-zones indicates an unrecorded area; a hatch line portion within the R-zones shows such an area which is required to be recorded by a recording command issued from a host within the recorded area; and a lateral line portion within the R-zones represents a linear replacement area within a user area where the drive actually records data in response to a recording command for the recorded area.

The upper disc diagram within FIG. 9 shows a disc status before the linear replacement process operation for the logical overwriting operation is carried out. Under this condition, the LRA1 of the R-zone becomes a physical address M−1. In this case, when a size "n" at a smaller address than the LRL1 is received, namely, a recording command for the recorded area within the R-zone 1, the drive corresponding to the logical overwriting operation performs a data recording operation from the LRA1 to the next required recording position, namely from the physical address "M" to the physical address "M+(n−1)" as represented in the lower disc drawing. Next, in order to indicate that the data have been recorded from the physical address "M" to the physical address "M+ (n−1)", which should be recorded from a physical address "L" to a physical address "L+(n−1)" on the optical disc corresponding to the logic addresses contained in the recording command, the drive combines two sorts of DLs indicative of a head and a tail of a linear replacement process operation with each other, and then, adds the combined DLs to the DLT, so that such a logical overwriting operation by directly utilizing the conventional defect managing idea may be realized. The above-explained two DLs (defect lists) correspond to a DL which is arranged by a status: linear replacement (head), a defect address: logical overwrite starting address, and a linear replacement address thereof; and also another DL which is arranged by a status: linear replacement (tail), a defect address: logical overwrite ending address, and a linear replacement address thereof. It should also be noted that a total number of defect addresses and a total number of replacement addresses are made coincident with each other which are sandwiched by the two DLs having the status: linear replacement (head) and the status: linear replacement (tail), while each of these DIs is identical to the DL having status: linear replacement shown in FIG. 7, for instance, a relationship between an address "L+3" and another address "N+3" may be regarded as such a DL that status: linear replacement, assuming now that an address "L+1" is a defect address and an address "N+1" is a linear replacement address.

In other words, in the write-once type optical disc, since the defect management is expanded, the logical overwriting operation may be easily realized. Also, in this case, since the spare area is employed as the replacement destination in the defect management, this spare area is required.

FIG. 10 represents a method for updating the RMD and the DLT within the RMA in such a case that the recording area management explained with reference to FIG. 9 and the defect management containing the logical overwriting operation explained with reference to FIG. 7 and FIG. 8. Each of DDS, DLT, and RMD is constituted by 1 ECC block. Also, the latest address information, namely such address information for indicating recording positions of effective DLT and effective RMD is recorded in the DDS. In the case that either the DLT or the RMD is updated, the DDS is similarly updated. The RMA is continuously used in an ascending order of physical addresses, and thus, the effective DDS is always arranged at an end (outermost position) of the recorded area. As a result, in such a case that an optical disc is inserted into an optical disc recording/reproducing apparatus (drive), the DDS recorded at the mostend portion of the RMA is firstly retrieved and reproduced, both an RMD and a DLT are read out by employing the address information indicative of the recording positions of the effective RMD and DLT contained by the DDS, so that the drive restores the latest recording area management information and the latest defect management information from the optical disc.

Figure 11:
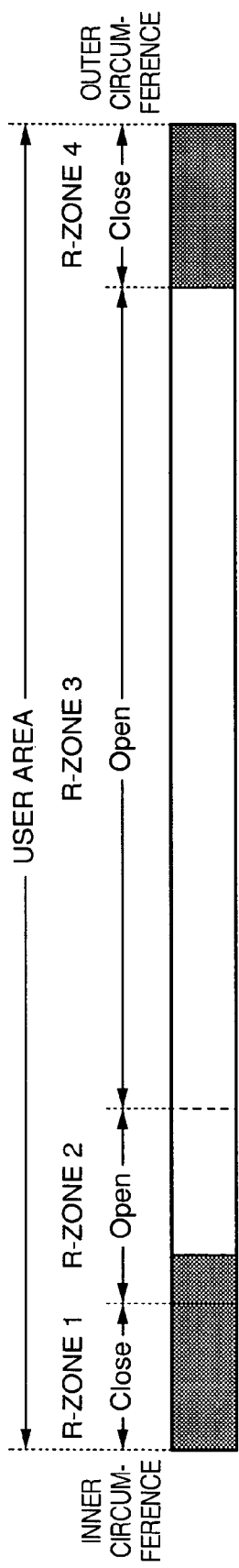
FIG. 11 is an explanatory diagram for showing a status of the write-once type optical disc just after a logic formatting operation.

FIG. 11 is a diagram for indicating arrangements of R-zones and file management information within a user area just after a write-once type optical disc is logically formatted. In this drawing, a place painted over with black indicates a recorded area, and a reverse-printed place shows an unrecorded area. Since either directories or files which should be managed by a file system after being logically formatted correspond to only route directories, file management information which should be recorded correspond to only anchor information for reading information, information for defining and recognizing volume spaces and partitions, and directory information which indicates that a route directory is empty. As a result, the user area of the optical disc is sectioned to 4 pieces of R-zones, namely, an R-zone 1, an R-zone 2, an R-zone 3, and an R-zone 4. That is to say, the R-zone 1 contains anchor information, volume management information conducted from the anchor information, and partition management information within a volume. The R-zone 2 is prepared in order that file management information corresponding to one partition and called as "meta data" is combined as a single mete data file, and the single meta data file is recorded at one place. The R-zone 3 is scheduled by that a file managed by the file management information is arranged. The R-zone 4 contains spare volume management information and anchor information.

In the R-zone 2, such a file management information is recorded which indicates that a route directly is empty, and the remaining portion is left as an unrecorded area which is used to update management information when either a file or a directly is newly added and deleted. In the R-zone 3, all of areas thereof become unrecorded areas in order to newly add a file, or the update a file. On the other hand both the R-zone 1 and the R-zone 4 are recorded by such an anchor information and volume management information, which are not substantially completely updated after the write-once type optical disc has been once formatted. As a consequence, these R-zone 1 and R-zone 4 are brought into Close statuses while an unrecorded area which becomes redundant is not contained.

Figure 12:
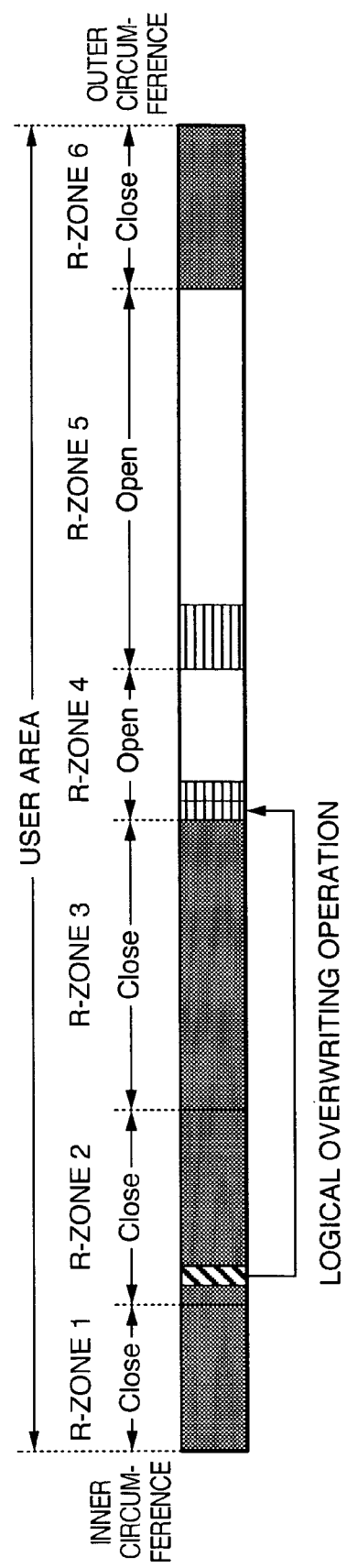
FIG. 12 is an explanatory diagram for representing one status of the write-once type optical disc while a file is once-written.

FIG. 12 shows an example as to the following case: That is, after the optical disc has been logically formatted as shown in FIG. 11, while either a directory or a file is newly added and is logically overwritten in a repetition manner, the directory or the file is added, updated, or deleted. As a result, all of unrecorded areas within the R-zone 2 have been recorded which have been secured for meta data file constituted from file management information, and then, the R-zone 2 is brought into a Close status. If the recordable areas of the R-zone 2 become empty, then such an area is required which is used to newly record therein management information of a directory and a file. As a result, a file system driver or application software for management the file system divide the R-zone 3 remained under Open status by the LRA, which has been provided so as to record files. The divided R-zones 3 become newly an R-zone 3 and an R-zone 4, and since the R-zone 3 is partitioned by the LRA, the partitioned R-zones 3 are brought into Close states. However, the remaining R-zone 4, the all areas of which are unrecorded areas, is again divided into two R-zone 4 and R-zone 5 for the same purpose as to the R-zone 2 and the R-zone 3 in FIG. 11. As a result, such an R-zone for combining the directory under Open status with the management information of the file with each other as a meta data file so as to record the combined meta data file, and another R-zone for recording a file are again formed.

FIG. 12 indicates such a status that a new file is additionally recorded from the above-described status; a lateral line area within the R-zone 5 shows such an area which becomes a recorded area since the new file is additionally recorded; and a lateral line area within the R-zone 4 represents such an area which becomes a recorded area, since both file management information additionally recorded in order to manage this new file and management information of the existing directory to which this new file is additionally provided have been updated. Although both the file and the file management information of the existing directory are newly added to be recorded, since the management information of the existing directory recorded in the R-zone 4 has already been present in the R-zone 2, this management information corresponds to such a management information updated/recorded by employing the logical overwriting operation shown in FIG. 9. Although the subdivision is carried out by the LRA in this drawing, a physical minimum recording unit of data in a DVD-R is an ECC block and a unit of an address in this DVD-R corresponds to 2 Kbytes. As a result, a position of a subdivision in this DVD-R becomes such an address (NWA) that an LRA which can be managed at an address boundary is corrected to an ECC block boundary, and next, data can be recorded. As previously explained, as the file recording method for recording the file in the write-once optical system of the file system using the logical overwriting operation, there is such a method for adding, correcting and deleting a file, while utilizing two sets of the R-zones under Open statuses, which are provided for recording a file after being logically formatted, and directory and file management information. As one of merits achieved by this recording method, while the management information for the files and the management information for the directories are adjoined to each other, two sorts of these management information are combined with each other so as to be recorded. As a result, the file retrieving operations which are carried out by continuously reading the management information for the plural files and the directory management information can be processed at a high speed. Also, there is a high possibility that the updating operation is also carried out in continuous addresses in conjunction with the logical overwriting operation of the file and directory management information while the new file is added, the file is partially corrected, and the file is partially deleted. Accordingly, it is expectable that a total DL number and time required for recording the management information can be suppressed to small values.

Figure 1:
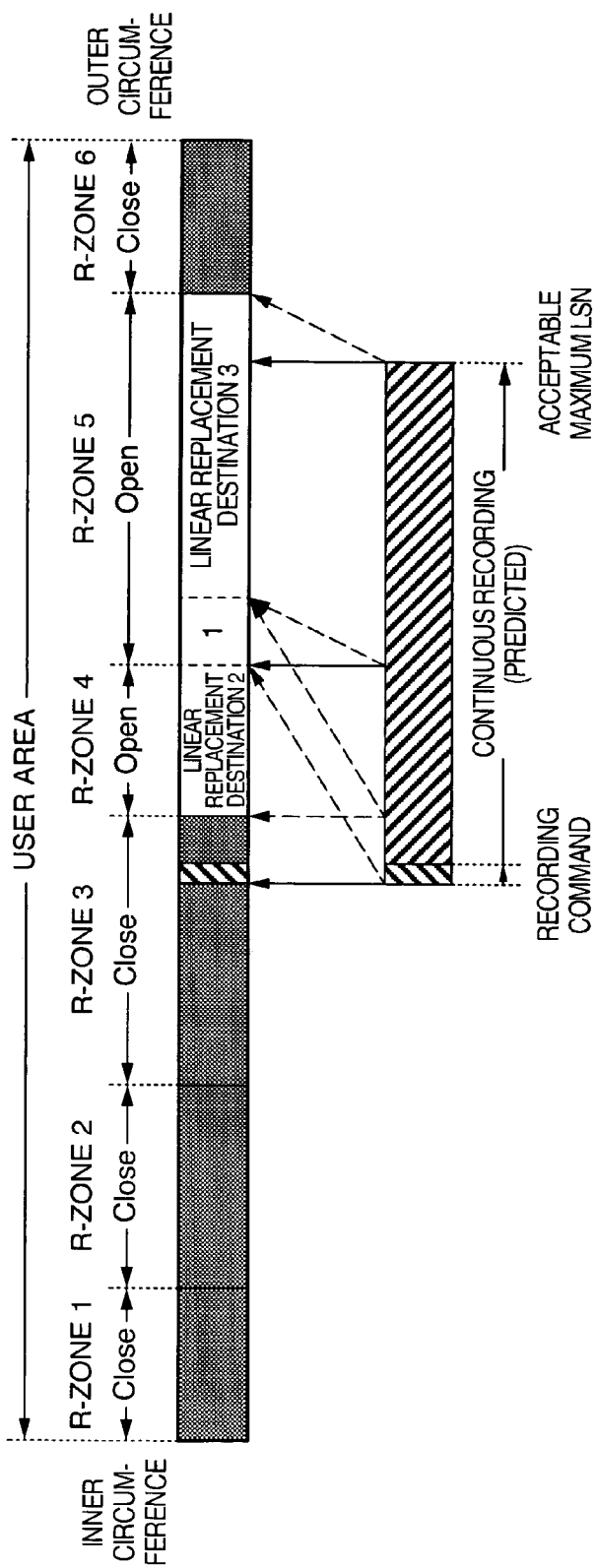
FIG. 1 is an explanatory diagram for explaining a using method of a write-once type optical disc.

FIG. 1 is an explanatory diagram for representing one status of the optical disc, which is contained in the explanation related to FIG. 12. That is to say, FIG. 1 represents such a diagram that two sorts of R-zones under Open statuses are formed after the R-zone 3 has been divided by the LRA, namely, both the R-zone 4 used to arrange the file and directory management information the R-zone 5 used to arrange the file are formed. Thereafter, how the write-once type optical disc recording apparatus determines a linear replacement destination of a logical overwriting operation with respect to a recording command issued from a host controlled by a file system and application software, so that the R-zones can be used in an ideal condition.

In a recording process operation in conjunction with an arbitrary over writing process operation from a host, linear replacement destinations are allocated in accordance with the below-mentioned rules 1 to 3.

1. The same R-zones which contain physical addresses included in the recording command.
2. R-zones having unrecorded areas in such a manner that the addresses thereof are larger than the address of the recording command, and a difference between an address before a linear replacement and another address after the linear replacement destination may become small as being permitted as possible except for adjacent R-zones in the case that the R-zone relevant to the condition 1 is under Close status.
3. An R-zone containing an unrecorded area having the maximum address among the remaining R-zones in the case that all of such R-zones related to the conditions 1 and 2 are under Close statuses.

In this case, FIG. 1 represents the control operation based upon the allocation rule of this linear replacement destination. While the recording process operations where a series of recording commands are coupled to each other are grasped as one recording process operation, the decision of the linear replacement destination based upon the allocation rule of this linear replacement destination is made when the recording command located at the head position of this recording process operation is received. In other words, when the optical disc recording apparatus receives such a recording command which is considered by that this recording command has been cut away from the preceding command group from the host, the optical disc recording apparatus predicts that the recording command group logically continued to this recording command is sent from the host, and previously allocates physical addresses corresponding to the respective logic addresses. It is so conceivable that a recording range contained in recording commands which are predictable to be continuously transferred from the host is made coincident with a total size of unrecorded areas on the optical disc, and the optical disc recording apparatus records the same sort of user data in a series of the recording process operations. That is to say, in this drawing, the recording process operations which are commenced from either the R-zone 2 or the R-zone 4 correspond to a series of recording process operations related to process operations for adding and updating the information for managing both the files and the directories; and the recording process operations which are commenced from either the R-zone 3 or the R-zone 5 correspond to a series of recording process operations related to process operations for additionally recording a new file and for correcting an existing file. In FIG. 1, since the recording command is commenced from the R-zone 3, such a process operation is conceivable by which a file has been partially corrected and has been logically overwritten.

In the optical disc recording apparatus according to the present invention, which records thereon the user data in accordance with the above-explained linear replacement rules, due to this logical overlapping process operation, a linear replacement process operation with respect to a first continuous recording command group containing a first recording command is recorded from the linear replacement destination allocating rule 2 to a head (corresponds to linear replacement destination 1 in the drawing of the R-zone 5). A second recording command group corresponding to the R-zone 4 is recorded on the R-zone 4 without requiring the logical overwriting process operation. Then, a third recording command group (remaining command group) is allocated to unrecorded portions from an address next to such an address which becomes LRA up to the remaining addresses after the recording process operation for the first recording command group within the same R-zone has been carried out in accordance with the linear replacement destination allocating rule 1.

As a result, a linear replacement destination of the R-zone 2 which is provided in order to couple the file management information with the directory management information becomes the R-zone 4 which is provided for the same object; a linear replacement destination of the R-zone 3 which is provided so as to arrange various sorts of files becomes the R-zone 5 which is provided so as to similarly arrange files; and the meta data files which are constituted by the file management information and the directing management to be recorded on the R-zone 2 and the R-zone 4 can be arranged on the optical disc without fragmentation.

It should also be understood that in such a case that recording of files is furthermore continued from the status of FIG. 12 and the unrecording areas of the R-zone 4 become zero to be brought into Close status, both a R-zone 6 used to arrange the file and directory management information and another R-zone 7 used to arrange the files may be newly formed in accordance with a process operation similar to that when the R-zone 4 and the R-zone 5 are formed; a linear replacement destination may be determined based upon the allocation rule of this linear replacement destination; and then, the R-zone 6 may be selected with respect to the logical overwriting process operation of the files recorded on the R-zone 3. Alternatively, the above-explained allocation rule of the linear replacement destination may be improved as explained in the below-mentioned description so as to be processed.

(Improved) 2.

R-zones having unrecorded areas in such a manner that when R-zones corresponding to the above-explained condition 1 are under Close statuses, addresses thereof become larger than an address of a recording command and an address difference between a pervious linear replacement and a linear replacement destination becomes small as being permitted as possible except for R-zones in which a difference of R-zone numbers becomes an add number.

If the above-described condition is employed, then the R-zone numbers as to the R-zone 6 and the R-zone 3 become 3, so that it is possible to avoid that the linear replacement destination of the R-zone 3 is defined as the R-zone 6.

Also, a lower portion of FIG. 1 indicates one example as to an LSN-to-PSN conversion list which manages allocations of linear replacement destinations.

The above-explained conversion list is used when a continuous recording operation using R-zones is carried out which includes a logical overwriting operation. Normally, this list constitutes such a list which is managed in the internal RAM of the optical disc recording apparatus. As shown in the drawing, the LSN-to-PSN conversion list with respect to the above-explained series of recording process operations is constituted by an LSN where the recording operation is started, a PSN where a recording operation is commenced which is made coincident with a head address of an unrecorded area within an R-zone under Open status in principle, and an address number of this unrecorded area within the R-zone. In other words, the recording start LSN corresponds to the recording start PSN which are managed in this list, and an LSN range within the range of the address number from the recording start LSN becomes such a subject which is recorded in an unrecorded area started from this recording start PSN. In FIG. 1, it is so assumed that the R-zone 4 of the upper drawing portion corresponds to such an unrecorded area made of "N2" pieces of addresses started from the recording start PSN C, whereas the R-zone 5 corresponds to such an unrecorded area made of (N1+N3) pieces of addresses started from the recording start PSN B. As a consequence, the LSN-to-PSN conversion list implies that the below-mentioned areas are recorded as follows: an area from LSN A contained in the first recording command up to LSN A+N1−1 is recorded from B corresponding to the head PSN within the R-zone 5 up to PSNB+N1−1; an area from the subsequent LSN A+N1 until LSN A+N1+N2−1 is recorded from C corresponding to the head PSN within the R-zone 4 up to PSN C+N2−1; and then, an area from LSN A+N1+N2 up to LSN A+N1+N2+N3−1 is recorded from B+N1 corresponding to PSN within the R-zone 5 subsequent to the head list up to B+N1+N3−1.

Figure 13:
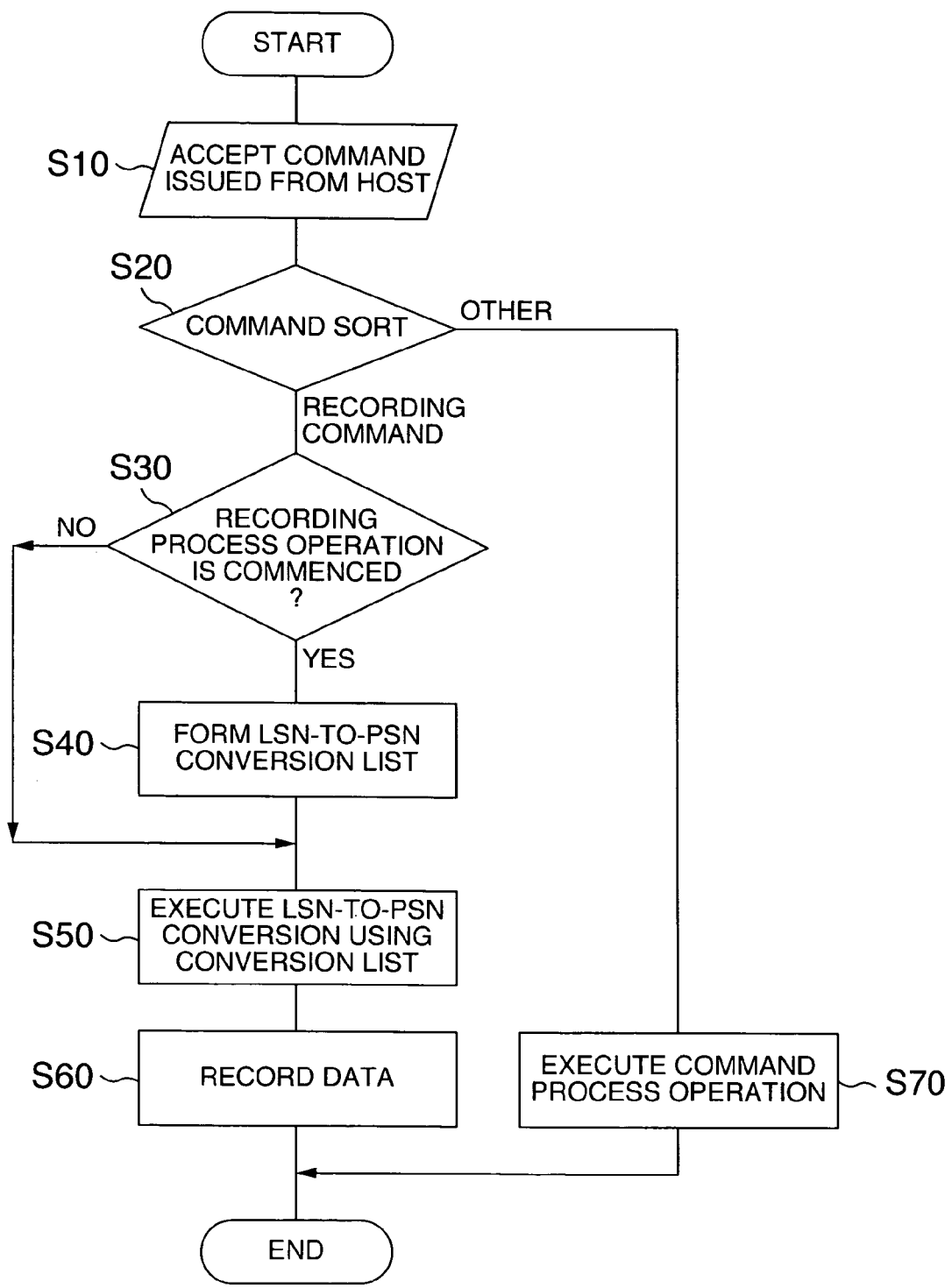
FIG. 13 is a film chart for describing operations with respect to a recording command of an optical disc recording apparatus according to an embodiment of the present invention.
Figure 14:
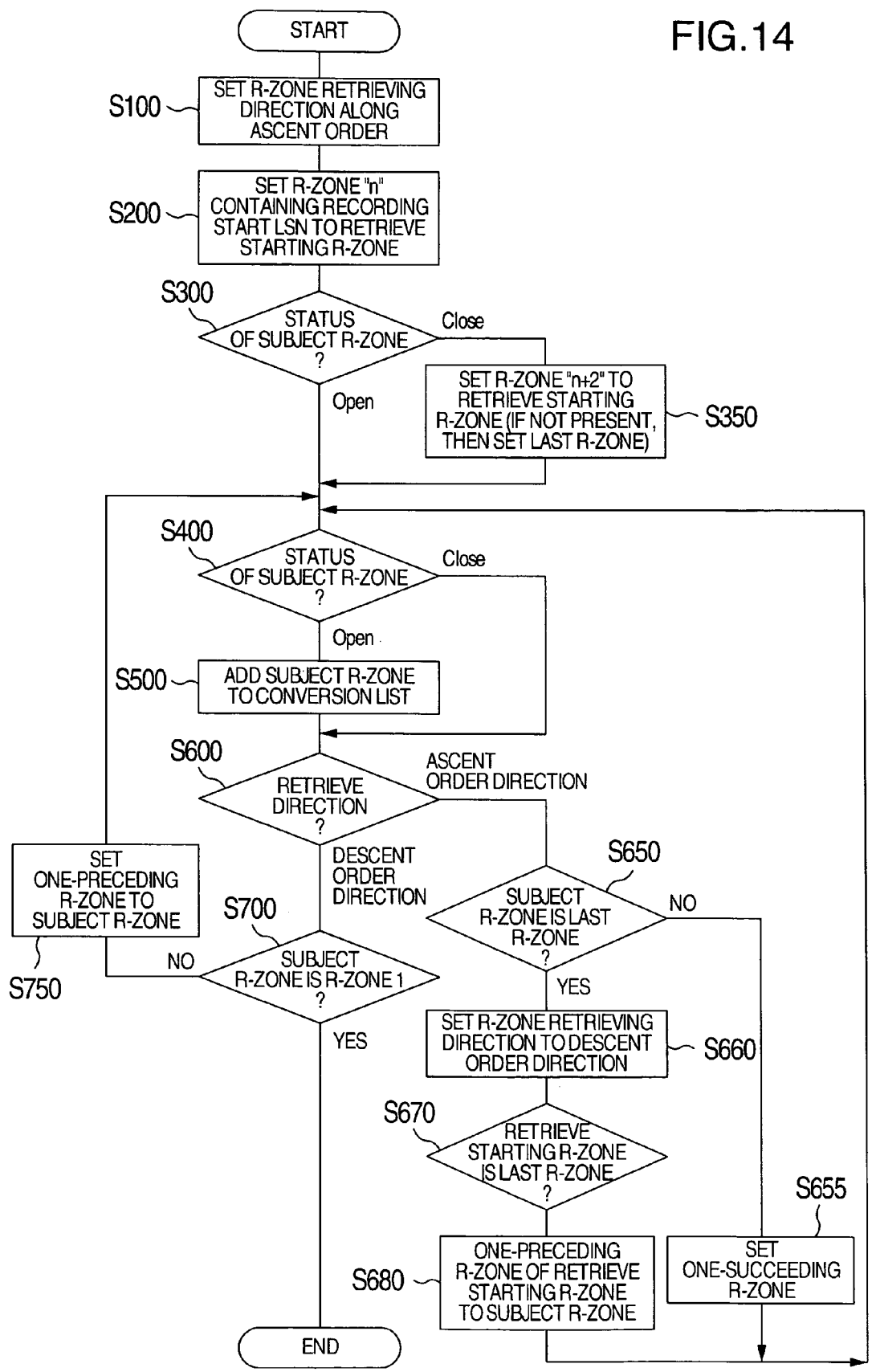
FIG. 14 is a flow chart for describing an algorithm of a first stage for producing an LSN-to-PSN conversion list.
Figure 15:
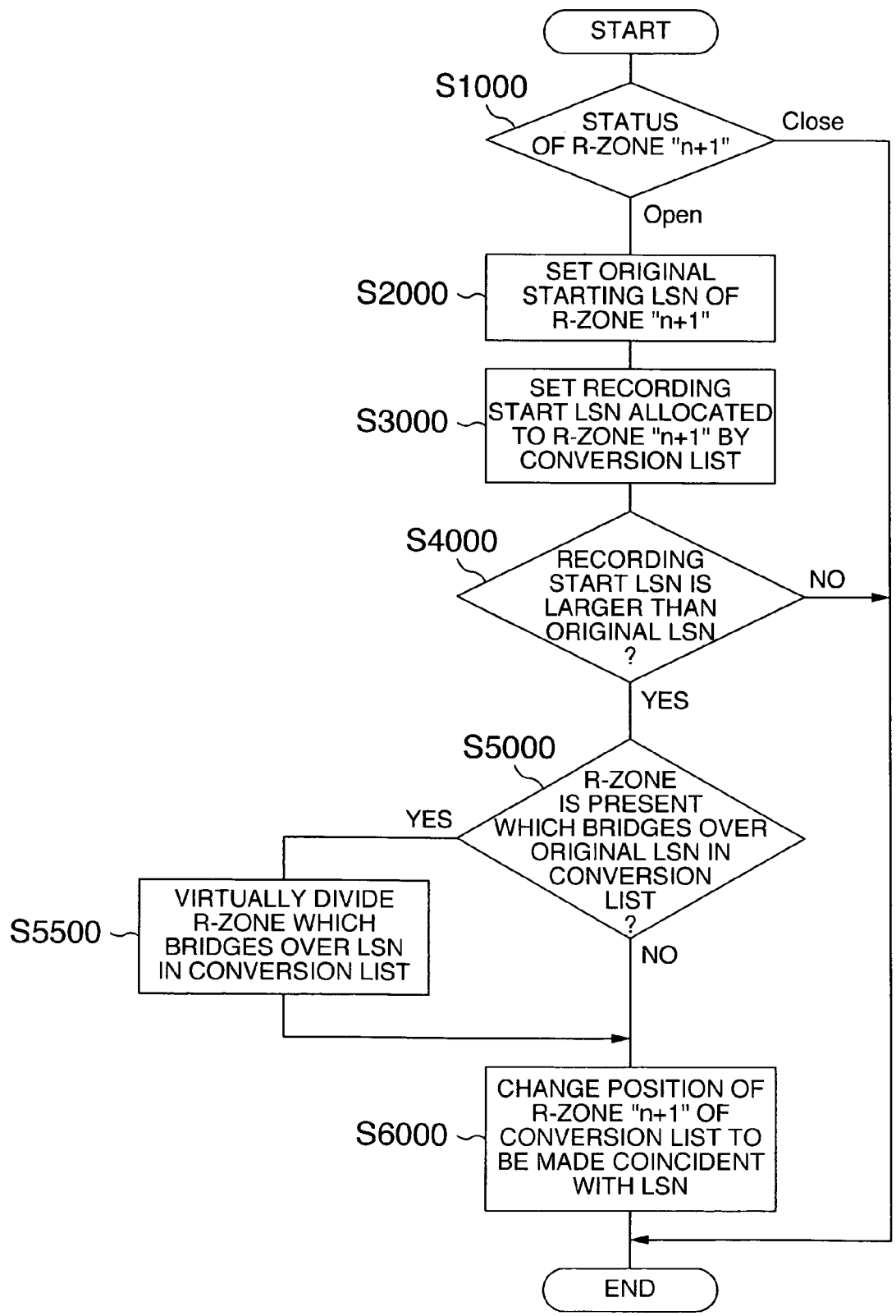
FIG. 15 is a flow chart for describing an algorithm of a second stage for producing an LSN-to-PSN conversion list.

FIG. 13, FIG. 14, and FIG. 15 show a technical idea in order that an algorithm for realizing the allocation rule of the linear replacement destination can be easily realized by the optical disc recording apparatus.

FIG. 13 is a flow chart for representing operations of the optical disc recording apparatus when a recording command issued from the file system, or the application software is accepted. With respect to a certain process command issued from the host (S10), the optical disc recording apparatus interprets a sort of this process command (S20), and performs an operation in response to the interpreted command. When this command is a recording command, the optical disc recording apparatus refers to a logic address contained in the recording command, and thus judges as to whether or not this recording command is continued to the previous command, and then switches operations (S20, 70). In the case that this recording command becomes the beginning command of a series of recording process operations (S30), the optical disc apparatus forms a conversion table for converting a recording process-purpose logic address (LSN) into a physical address (PSN) (S40), while a logic address contained in this recording command is employed as a starting point. Thereafter, while a physical address corresponding to the logic address contained in the recording command is acquired based upon the above-described LSN-to-PSN conversion list, the optical disc recording apparatus records data on the optical disc (S50). Also, when the recording command is continued from the previous recording command, the optical disc recording apparatus records data at a physical address position on the optical disc (S60), which corresponds to the logic address contained in each of the recording commands based upon the LSN-to-PSN conversion list formed when the recording process operation is commenced.

FIG. 14 is a flow chart for indicating one example as to an algorithm of a first stage in forming of the above-explained LSN-to-PSN conversion list in the flow chart of FIG. 13.

As to required variable parameters, there are 3 variable parameters: information indicative of a retrieving direction, an R-zone number from which a retrieving operation is commenced, and an R-zone number where the retrieving operation is carried out.

When the retrieving operation is commenced, the retrieving direction is set in an ascent order (S100), and an R-zone containing a PSN which corresponds to an LSN contained in a recording command issued from a host is acquired (S200). Next, the optical disc recording apparatus judges that this acquired R-zone is under Open status or under Close status (S300). When the acquired R-zone is under Open status, the retrieve starting R-zone is set to this R-zone (S350), whereas when the acquired R-zone is under Close status, the retrieve starting R-zone is set to such an R-zone having an R-zone number calculated by adding +2 to this R-zone number. At this time, if the corresponding R-zone is not present, then a final R-zone having a final R-zone number is set to the retrieve starting R-zone. Also, in the case that the allocation rule 2 (improved rule) of the linear replacement destination is utilized, such a process operation is repeated that an R-zone under Open status is searched in R-zones obtained by sequentially adding +2 to this R-zone number, and then, a R-zone which could be found out at the first is set to the retrieve starting R-zone.

As previously explained, after the retrieve starting R-zone has been set, the retrieve starting R-zone is initially set as a retrieve subject R-zone where the retrieving operation is carried out (S400); subsequently, if the retrieve subject R-zone is under Open status, then the retrieve subject R-zone is added to a linear replacement destination subject of the LSN-to-PSN conversion list; such an R-zone subsequently continued thereto is set to the retrieve subject R-zone; and the set retrieve subject R-zone is updated (S500). The above-explained retrieving operation is continuously carried out until the retrieve subject R-zone becomes a final R-zone; When the retrieve subject R-zone becomes the final R-zone, the retrieve direction is set in a descent order (S600, S700); and an R-zone located before the retrieve starting R-zone by 1 zone is set to the subsequent retrieve subject R-zone (S750) Thereafter, similar to the above-explained operations when the retrieving operation is performed in the ascent order (S650, S655, S660, S670, S680), if the retrieve subject R-zone is under Open status, then the retrieve subject R-zone is added to the linear replacement subject of the LSN-to-PSN conversion list, and such an R-zone located before this retrieve subject R-zone by 1 zone is set to the retrieve subject R-zone so as to update this set R-zone. The above-described retrieving operation is continued until the subject R-zone becomes the R-zone 1, the subject R-zone finally becomes 1, and after the LSN-to-PSN conversion list is changed if necessary, the first stage process operation for forming the LSN-to-PSN conversion list is accomplished.

FIG. 15 is a flow chart for indicating one example as to an algorithm of a second stage in forming of the above-explained LSN-to-PSN conversion list in the flow chart of FIG. 13. A processing purpose described in this algorithm is to correct a position within the LSN-to-PSN conversion list of an adjoining R-zone if necessary, which is not considered in the first stage process operation of forming the LSN-to-PSN conversion list. That is, in the beginning, the optical disc recording apparatus checks as to whether an R-zone (n+1) is under Open status, or under Close status (S1000), while this R-zone (n+1) is located adjacent to an R-zone (n) which contains PSN corresponding to LSN included in a recording command issued from a host. If the adjoining R-zone (n+1) is under Close status, then the adjoining R-zone (n+1) is not contained in the LSN-to PSN conversion list, and then, the processing operation is ended. If the adjoining R-zone (n+1) is under Open status, then a starting address of LSN to which the head PSN of the adjoining R-zone (n+1) originally corresponds is compared with a starting address of LSN which has been allocated to the adjoining R-zone (n+1) in the first stage for forming the LSN-to-PSN conversion list (S2000, S3000). In the case that the LSN acquired from the LSN-to-PSN conversion list is smaller than the originally corresponding LSN (S4000), the process operation is accomplished without any change. In the case that the LSN acquired from the LSN-to-PSN conversion list is larger than the originally corresponding LSN (S5000), the position of the adjoining R-zone (n+1) within the LSN-to-PSN conversion list is coincident with such an LSN to which the head PSN of the adjoining R-zone (n+1) originally corresponds, and is corrected in such a manner that this correction is fitted to the allocation rule 1 of the linear replacement destination. In response to the correction of the adjoining R-zone (n+1), as represented in the R-zone 5 of FIG. 1, there are some cases that a single R-zone must be divided (S5500). In this case, since the R-zone to be divided is virtually subdivided in the LSN-to-PSN conversion list to be handled, this subdivision may be adapted to the correction of the LSN-to-PSN conversion list (S6000).

It should also be understood that the algorithm described in this flow chart can be readily realized by the optical disc recording apparatus shown in FIG. 4. That is to say, in the optical disc recording apparatus, in such a case that the control microcomputer 404 judges that a recording command issued from the host corresponds to such a recording command equivalent to a commencement of a series of recording operations, while user data transferred from the host is temporarily stored in the RAM employed in the interface 406, the control microcomputer 404 forms an LSN-to-PSN conversion list in accordance with the above-described flow chart. Thereafter, an amount of the user data transferred from the host is reached to a constant amount, and then, a predetermined time has elapsed, or while the LSN-to-PSN conversion list is employed, a recording position on the optical disc 401 is determined to actually record data in response to a cache-stored data forcible recording command issued from the host.

Since the allocation rule of the linear replacement destination explained in the present invention is applied to the logical overwriting process operation of the write-once type optical disc, the proper R-zone is selected from the R-zones provided in response to a purpose sort. As a result, it is possible to suppress the fragmentation on the optical disc, which may be possibly produced by the logical overwriting operation.

As a result, the data can be recorded on the optical disc at a high speed, and further, the data can be reproduced from the optical disc at a high speed. Also, the R-zones are provided in the inner circumferential portion of the optical disc, on which the file system driver and the application software, which essentially record data on an optical disc, intentionally record the file management information and the directory management information. As a consequence, these file and directory management information can be protected from fingerprints and scratches, which may easily cause reproduction errors of the optical disc. Therefore, safer optical disc recording and reproducing environments can be provided in higher performance.

Although the embodiments as to the recording method and the optical disc recording apparatus according to the present invention have been described in detail, the present invention is not limited only to these embodiments, but may be modified and changed without departing from the technical scope and spirit of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A write-once type optical disc recording method for performing a logical overwriting process operation with respect to a write-once type optical disc having a read-in, a user area, and a read-out by employing defect management information which is recorded in said read-in, the recording method comprising the steps of:

dividing said user area into 3, or more pieces of R-zones; at least 2 recordable R-zones having recordable areas are present; and determining a linear replacement destination of a logical overwriting process operation with respect to an arbitrary region of said unrecordable R-zone to such an R-zone other than an R-zone having a recordable area, which is located adjacent to said unrecordable R-zone when an unrecordable R-zone having no recordable area is present on the read-in side rather than two, or more pieces of the R-zones among the R-zones having the recordable areas.

2. A write-once type optical disc recording method for performing a logical overwriting process operation with respect to a write-once type optical disc having a read-in, a user area, and a read-out by employing defect management information which is recorded in said read-in, the recording method comprising the steps of:

dividing said user area into a plurality of R-zones to which numbers are allocated, said numbers being incremented one by one from the read-in side to the read-out side; and when at least 2, or more pieces of R-zones having recordable areas are present; and determining a linear replacement destination of a logical overwriting process operation with respect to an arbitrary area within an R-zone of an R-zone number having no recordable area to such an R-zone having an R-zone number except for R-zone numbers (N+2×n) (symbol "n" being natural number) having recordable areas, said R-zone of the R-zone number N having no recordable area being arranged on the read-in side rather than two, or more pieces of continuous R-zones among the R-zones having the recordable areas.

3. A write-once type optical disc recording method for performing a logical overwriting process operation with respect to a write-once type optical disc having a read-in, a user area, and a read-out by employing defect management information which is recorded in said read-in, the recording method comprising the steps of:
dividing said user area into a plurality of R-zones; at least 2 recordable R-zones having recordable areas are present; when a linear replacement destination of a logical overwriting process operation with respect to an arbitrary region within said user area is determined, a judgement is made as to whether or not a first R-zone containing said arbitrary area owns a recordable area;
determining said first R-zone as said linear replacement destination in case that said first R-zone owns the recordable area; and
further determining a third R-zone having an unrecordable area as said linear replacement destination except for a second R-zone located adjacent to said first R-zone in the case that said first R-zone does not have the recordable area, said third R-zone being located at the nearest position among positions of the plural R-zones on the read-out side rather than said arbitrary area.

4. A write-once type optical disc recording method as claimed in claim 3 wherein:
in the case that the third R-zone having the unrecorded area is not present which is located at the nearest position among the positions of the plural R-zones on the read-out side rather than said arbitrary area, an R-zone having an unrecorded area which is arranged at the most read-out side among the remaining R-zones is further determined as the linear replacement destination.

5. A write-once type optical disc recording method for performing a logical overwriting process operation with respect to a write-once type optical disc having a read-in, a user area, and a read-out by employing defect management information which is recorded in said read-in, the recording method comprising the steps of:
dividing said user area into a plurality of R-zones to which numbers are allocated, said numbers being incremented one by one from the read-in side to the read-out side; at least 2, or more pieces of recordable R-zones having recordable areas are present; when a linear replacement destination of a logical overwriting process operation with respect to an arbitrary region within said user area is determined;
judging as to whether or not an R-zone "N" containing said arbitrary area owns a recordable area;
determining said R-zone "N" as said linear replacement destination in the case that said R-zone "N" owns the recordable area; and
further determining an R-zone having an unrecorded area is determined as said linear replacement destination except for R-zones (N+2×n)(symbol "n" being natural number) in the case that said R-zone "N" does not have the recordable area, said R-zone being arranged at the nearest read-out side rather than said arbitrary area.

6. A write-once type optical disc recording method as claimed in claim 5 wherein:
in the case that the R-zone N containing said arbitrary area does not have a recordable area, but also, the R-zone having the unrecorded area and arranged at the nearest read-out side rather than said arbitrary area is not present, such an R-zone having an unrecorded area is further determined as the linear replacement destination, while said R-zone having the unrecorded area is arranged on the most read-out side among the remaining R-zones.

7. A recording apparatus of a write-once type optical disc, for performing a logical overwriting process operation with respect to the write-once type optical disc having a read-in, a user area, and a read-out by employing defect management information which is recorded in the read-in thereof, wherein:
in the case that said user area is divided into a plurality of R-zones and at least two, or more pieces of R-zones having recordable areas are present, when a recording process operation to an arbitrary recorded area is accepted, recording positions of an entire record acceptable areas where said recorded arbitrary area is defined as a head are allocated in this order of:
(1) the same R-zones containing said recorded arbitrary area,
(2) in the case that an R-zone corresponding to the above-described 1 does not have a recordable area, such an R-zone having an unrecorded area which is arranged at the nearest read-out side rather than said area except for an R-zone located adjacent to said R-zone, and
(3) in the case that all of R-zones corresponding to the above-described 1 and 2 do not have a recordable area, or such an R-zone corresponding to the above-described 1 and 2 is not present, such an R-zone having an unrecorded area, which is arranged at the most read-out side among the remaining R-zones.

8. A recording apparatus of a write-once type optical disc, for performing a logical overwriting process operation with respect to the write-once type optical disc having a read-in, a user area, and a read-out by employing defect management information which is recorded in the read-in thereof, wherein:
in the case that said user area is divided into a plurality of R-zones to which numbers are allocated, said numbers being incremented one by one from the read-in side to the read-out side, and at least two, or more pieces of R-zones having recordable areas are present, when a recording process operation to an arbitrary recorded area is accepted, recording positions of an entire record acceptable areas where said recorded arbitrary area is defined as a head are allocated in this order of:
(1) the same R-zones "N" containing said recorded arbitrary area,
(2) in the case that an R-zone corresponding to the above-described 1 does not have a recordable area, such an R-zone having an unrecorded area which is arranged at the nearest read-out side rather than said area except for an R-zone (N+2×n)(symbol "n" being natural number), and
(3) in the case that all of R-zones corresponding to the above-described 1 and 2 do not have a recordable area, or such an R-zone corresponding to the above-described 1 and 2 is not present, such an R-zone having an unrecorded area, which is arranged at the most read-out side among the remaining R-zones.

* * * * *